(12) United States Patent
Tamai et al.

(10) Patent No.: US 6,307,277 B1
(45) Date of Patent: Oct. 23, 2001

(54) APPARATUS AND METHOD FOR A TORQUE AND FUEL CONTROL SYSTEM FOR A HYBRID VEHICLE

(75) Inventors: Goro Tamai; Tony T. Hoang, both of Warren; Dennis T. Richey, Sterling Heights, all of MI (US); Robert C. Downs, La Jolla, CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/551,460

(22) Filed: Apr. 18, 2000

(51) Int. Cl.[7] .................................................. F02N 11/06
(52) U.S. Cl. ........................................ 290/40 C; 180/65.2
(58) Field of Search ..................... 290/40 C, 14, 290/19; 318/140, 139; 180/65.2, 65.3, 65.4; 123/2

(56) References Cited

U.S. PATENT DOCUMENTS

| | | | |
|---|---|---|---|
| 4,269,280 | * 5/1981 | Rosen ............................... | 180/69.6 |
| 4,351,405 | * 9/1982 | Fields et al. .................... | 180/65.2 |
| 4,438,342 | * 3/1984 | Kenyon ............................. | 290/45 |
| 5,249,637 | * 10/1993 | Heidl et al. ..................... | 180/65.2 |
| 5,568,023 | * 10/1996 | Grayer et al. ................... | 318/139 |
| 5,713,425 | * 2/1998 | Buschhaus et al. ............ | 180/65.2 |
| 5,789,881 | * 8/1998 | Egami et al. ................... | 318/139 |
| 5,801,497 | * 9/1998 | Shamoto et al. ................ | 318/139 |
| 5,890,468 | * 4/1999 | Ozawa ............................... | 123/561 |
| 5,909,720 | * 6/1999 | Yamaoka et al. ................ | 123/179.3 |
| 5,934,395 | * 8/1999 | Koide et al. .................... | 180/65.2 |
| 6,020,697 | * 2/2000 | Shimasaki et al. ............ | 318/140 |
| 6,067,801 | * 5/2000 | Harada et al. .................. | 60/705 |
| 6,131,538 | * 10/2000 | Kanai ................................ | 123/2 |
| 6,155,364 | * 12/2000 | Nagano et al. ................. | 180/65.2 |
| 6,166,517 | * 12/2000 | Wakashiro et al. ............ | 320/104 |
| 6,196,344 | * 3/2001 | Tamor .............................. | 180/65.4 |
| 6,231,135 | * 5/2001 | Bower et al. ................... | 303/152 |

FOREIGN PATENT DOCUMENTS

| | | |
|---|---|---|
| 4142863 | * 4/1993 | (DE) . |
| 925981A2 | * 6/1999 | (EP) . |

* cited by examiner

*Primary Examiner*—Joseph Waks
(74) *Attorney, Agent, or Firm*—Anthony Luke Simon

(57) ABSTRACT

A fuel management control method for a hybrid electric vehicle drive having an internal combustion engine and an electric motor arranged in parallel such that both can propel the vehicle; the system including an electric motor driven fuel pump and a programmable microprocessor; and wherein the method further includes monitoring vehicle speed and sensing braking pressure and directing signals of both vehicle speed and braking to the microprocessor and processing such inputs in accordance with an aggressive fuel management program including shut-off of fuel flow to the gas engine in response to vehicle braking at vehicle speeds above a predetermined maximum hysteresis speed and maintaining the fuel shut off during vehicle coasting above a predetermined speed while controlling the electric motor to provide regenerative braking or vehicle start during such fuel shut off modes of operation.

19 Claims, 7 Drawing Sheets

APPARATUS AND METHOD FOR A TORQUE AND FUEL CONTROL SYSTEM FOR A HYBRID VEHICLE

This patent application is related to U.S. patent applications Ser. Nos. 09/483,986 and 09/483,987 the contents of which are incorporated herein by reference thereto.

TECHNICAL FIELD

The present invention is related to a method and apparatus for minimizing the torque oscillations in the driveline of a hybrid vehicle during accelerations and decelerations.

BACKGROUND OF THE INVENTION

Passenger comfort and fuel efficiency have set forth increasing demands on automotive vehicle designs. It is a primary goal of most vehicle designs to provide a more efficient vehicle without having to sacrifice passenger comfort and satisfaction.

Moreover, and as alternative vehicle propulsion systems are implemented, passenger comfort and fuel efficiency are sometimes in opposition to each other. This is particularly true in hybrid vehicle designs.

A Hybrid Vehicle is a vehicle that has two sources of propulsion. A hybrid electric vehicle (HEV) is a vehicle wherein one of the sources of propulsion is electric and the other source of propulsion may be derived from fuel cells or an internal combustion engine (ICE) that burns diesel, gasoline or any other source of fuel.

Generally, a hybrid vehicle utilizes either one or two drive trains wherein the internal combustion engine (ICE) provides torque to one of the drive trains and an electrical driving force is applied to either of both of the drive trains.

The torque characteristics produced by an internal combustion engine are significantly different than those produced by an electric motor. For example, an electric motor provides higher torques at lower rpms while an internal combustion engine develops lower torques at lower rpms.

Generally, a conventional automatic transmission, clutch-to-clutch auto transmission and or manual transmission is coupled to an internal combustion engine. The transmission is positioned in the drive train between the internal combustion engine and the driven wheels. The transmission includes a case containing an input shaft, an output shaft, and a plurality of meshing gears. Means are provided for connecting selected ones of the meshing gears between the input shaft and the output shaft to provide a desired speed reduction gear ratio therebetween. The meshing gears contained within the transmission case are of varying size so as to provide a plurality of such gear ratios. By appropriately shifting among these various gear ratios, acceleration and deceleration of the vehicle can be accomplished in a smooth and efficient manner.

However, the drivability of a hybrid vehicle is adversely affected due to the torque oscillations that occur when abrupt torque changes are encountered in the operation of the internal combustion engine and the transmission coupled to it. Such oscillations are encountered during shifting, launching end starting and stopping of the engine in order to conserve fuel.

Accordingly, and in order to meet the torque demand of the automobiles acceleration, a transmission having multiple gear ratios must be coupled to an internal combustion engine.

Additionally, and as the transmission of an internal combustion engine shifts through its gear cycle, the engine driveshaft is generally disengaged from the transmission through a clutch mechanism which allows for the shifting of the gears. Once the gear transfer is complete the driveshaft is reengaged to the transmission.

Thus, the opening and closing of a clutch mechanism causes the drive train of an internal combustion engine to have a series of torque transfers with a steep drop-off or gap in between each series of transfer.

This presents a particular problem in hybrid vehicles where both an internal combustion engine and an electrically driven engine provide a driving force to the vehicle. Moreover, and in order to improve fuel economy, the internal combustion engine is frequently shut off and restarted. This cycling on off of the engine will also create a series of torque transfers with a speed drop-off or gap.

In order to provide a highly efficient hybrid vehicle that utilizes a fuel efficient internal combustion engine, the torque oscillations caused by a direct coupled drive train must minimized.

In addition, hybrid vehicles also utilize a concept known as regenerative braking. Generally, regenerative braking is the conversion of the vehicle's kinetic energy into a source of electrical power. The vehicle's kinetic energy is converted from the moving vehicle, in response to a user request to slow or stop the vehicle. A generator is manipulated, and accordingly, produces electrical energy as it applies a stopping force to the vehicle's axle and/or drive train in response to a stopping request.

Therefore, and in accordance with regenerative braking, the kinetic energy is converted to electric energy, as the vehicle begins to slow down.

SUMMARY OF THE INVENTION

An object of the present invention is to make the fuel on-off-on transitions during a vehicle deceleration as transparent as possible to the occupant or driver.

In an exemplary embodiment, the hybrid deceleration control system makes the fuel on-off-on transitions as transparent as possible. The initial fuel-off transition is performed by ramping spark and cutting fuel (cylinder by cylinder) to balance smoothness and emissions. Once decelerating with fuel off, the engine is kept spinning by the reverse-freewheel torque converter, and the downshifts normally performed with the aid of the idle-air-control system are performed with the electric motor/generator. Finally, as a function of the gear, engine rpm, and deceleration rate, the transmission is dropped to neutral just before compression bobble becomes objectionable.

Another object of the present invention is to control the system that is implemented to enable smooth fuel-off decelerations and reaccelerations.

An object of the present invention is to provide a hybrid vehicle having a parallel propulsion system wherein one of the propulsion systems is an internal combustion engine coupled to an automatic transmission and the torque interruptions and or oscillations associated with such a configuration are anticipated and produced by controlling the blending of the two propulsion systems.

Another object of the present invention is to provide a secondary propulsion system that generates a source of energy in addition to providing a secondary driving force for the hybrid vehicle.

The present invention includes a hybrid-electric vehicle (HEV) that has an internal combustion engine connected to drive a multi-speed automatic transmission that can, if desired, include a torque converter.

Additionally, the HEV includes an electric machine having a rotor connected to the crankshaft of the engine and a stator and a controller for selectively controlling the electric machine to serve as an electric starter or as a generator for regenerative braking during vehicle drive so as to charge an associated battery pack. An engine (fuel, spark, etc.) and transmission controller is provided that is operative in response to vehicle braking and further is operative to respond to vehicle speeds in different ranges to improve fuel consumption characteristics of the vehicle.

The advantage of such drive arrangement is that fuel control can be provided that will entirely cut off fuel flow during vehicle decelerations and stops. Integration of electric motor mechanically connected to the crankshaft of the internal combustion engine allows the shut off of fuel and restart of the gas engine to be conducted virtually transparent to the driver.

The control of the gas engine and electric motor is according to routines that operate in conjunction with the usual operation of an engine driven automatic transmission system for driving the wheels of the vehicle. In such systems the engine is driven by an electric motor starter and fuel is applied during an engine startup mode. The transmission is placed in a drive mode and the vehicle is accelerated by depressing the accelerator pedal for supplying more fuel and air to the engine. When the vehicle is up to speed the torque converter lock-up clutch is applied in the transmission is, for example, in a forward speed selection position such that the vehicle cruises under the power of the gasoline engine and if desired, a portion of the cruise power can be supplied by the electric motor (especially at lower startup speeds).

In such systems, when the accelerator pedal is released, the fuel can be cut depending on vehicle speed and gear setting. Above a prescribed vehicle speed, if the torque converter clutch is locked, or if a reverse locking one-way clutch is operable to lock the turbine and impeller of a torque converter as set-fourth in copending U.S. Ser. No. 09/483,987, office file H-204481, the electric motor can be controlled to deliver regenerative braking during decelerations to recharge a battery pack.

Under one control routine, when the brake pedal is depressed a brake sensor is operative to produce a signal that is processed by a microprocessor to maintain the fuel fully cut-off with the entire deceleration of the vehicle during which regenerative braking is operable in the regen-able speed range of operation.

In a lower speed range of vehicle speeds in the brake-start range of operation, if the brake pedal is released during deceleration, the engine can be restarted with the release of the brake pedal and a re-supply of fuel.

Thus, an object of the present invention is to provide a fuel management control method for a hybrid vehicle drive having a transmission with gear settings, an internal combustion engine an electric motor arranged in parallel such that both can propel the vehicle; the system including an electric motor driven fuel pump and a programmable microprocessor the method comprising the steps of monitoring vehicle speed; sensing braking pressure; shutting-off fuel flow to the gas engine in response to vehicle braking at predetermined vehicle speeds and gear settings and maintaining the fuel shut off during vehicle coasting while controlling the electric motor to provide either engine starting or regenerative braking depending upon the vehicle speed.

Another object of the invention is to provide an improved method of fuel control for a hybrid electric vehicle including a drive system with an internal combustion engine and an electric machine operated as an electric motor to electrically turn the engine so as to electrically creep start the vehicle without supply of fuel or spark to the internal combustion engine and as a generator to produce regenerative braking and wherein the electric motor is connected via a drive belt to the crankshaft of the engine and wherein fuel is cut-off in accordance with an aggressive fuel control algorithm responsive to brake pedal operation in brake start range and in a hysteresis speed range and to a combination of gas pedal position and brake pedal position in speed ranges above the hysteresis speed range.

A feature of the present invention is to, if desired, provide a torque converter having a mechanical one-way clutch connected between the pump and turbine of the torque converter that free wheels in the input drive direction and wherein the one-way clutch locks to directly connect the torque converter turbine and impeller during any back drive produce during vehicle coasting to prevent engine stall.

A feature the present invention is to initiate such fuel control when the vehicle transmission is in a forward drive mode and decelerating.

A feature of the present invention is to initiate such fuel control when the vehicle transmission is in a forward drive mode and decelerating upon application of a brake pedal.

A feature of the present invention is to initiate such fuel control when the vehicle transmission is in a forward drive mode and decelerating upon release of an accelerator pedal.

Still another object of the present invention is to provide an improved method for operating a hybrid vehicle having an internal combustion engine; a torque converter with an impeller turbine connection through a forward drive free wheeling and reverse drive locking one-away clutch connection and an electric motor generator connected to the crankshaft of the internal combustion engine by a drive belt, or direct mounting on the crankshaft, and controlling the electric motor to charge batteries during vehicle deceleration/coasting operation and providing an engine fuel controller and operating the controller to be responsive to vehicle operations causing coasting to provide an aggressive fuel flow cut-off while the torque converter clutch or free wheel drive is operative to prevent the internal combustion engine from stalling upon fuel flow cut-off during such coasting operation.

Yet another feature of the invention is to provide a fuel management control method for a hybrid electric vehicle drive having an internal combustion engine and an electric motor arranged in parallel such that both can propel the vehicle; the system including an electric motor driven fuel pump and a programmable microprocessor the method comprising: providing a belt drive connection between the electric motor and the engine; providing a torque converter with an impeller turbine connection through a forward drive free wheeling and reverse drive locking one-way clutch connection in the vehicle drive and controlling the electric motor to charge batteries during vehicle deceleration/coasting operation and during regular cruising if the battery state of charge is low and cutting off fuel flow to the engine in response to either gas pedal or brake operation while the torque converter is operative thereby to synchronize overdrive of the vehicle during coasting with the engine speed to prevent the internal combustion engine from stalling upon fuel flow cut-off during such coasting operation.

A further advantage is during decelerations from a regenerative braking speed range referred to as Regen-Able speed range, the fuel flow can be cut off when the accelerator pedal is released, or when the brake pedal is depressed depending on the vehicle speed and gear setting. In this routine, as the vehicle continues to roll forward, the electric motor's polarity can be reversed to activate regenerative braking which helps decelerating vehicle and recharge an associated battery pack. The torque converter clutch 105 or the reverse locking clutch 34 is kept active in the Regen-Able speed range so as to keep the gas engine spinning so that the engine firing can be easily restored if the accelerator is depressed.

A further feature is to provide such method of control in a hybrid vehicle gear having a multi-transmission and wherein in higher gear (e.g. third and fourth) and above a critical speed Vtps release of the gas pedal initiate an engine fuel-off sequence.

Another feature is to provide the preceding fuel control sequence including the step of providing a timer that delays the beginning of the fuel cutoff sequence.

Still another feature is to provide such timed control of fuel shut-off including shutting off fuel, one cylinder at a time to provide a smooth deceleration feel. For lower gears (e.g. 1st and 2nd) and under a critical speed, fuel cutoff is initiated by the application of the brake pedal.

A still further feature is to provide such method of control where, at some high speed, if the fuel is shut off (by either release of gas pedal or application of brake), and the driver coasts with no pedal application, a reverse freewheel will back-drive the engine until some low engine RPM at which the compression pulses of the engine become objectionable; the transmission operative to drop to first gear (effectively neutral since the first gear has a freewheel). And wherein fuel and spark is delivered to the engine just before this drop-to neutral point so as to not stall the engine; the drop-to-neutral point being calibrated as a function of deceleration rate.

A further variant is to include the step of restarting a stalled engine from a no-pedal condition by applying the gas pedal.

A further method includes providing a microprocessor having a computer program including a "hybrid-active speed" as the speed that the car needs to exceed for the hybrid system to become active (i.e. fuel cutoff enabled); and wherein a speed hysteresis is included in the hybrid-active speed having a hybrid-active speed for acceleration Va, and having another for deceleration Vd and wherein the quantification of acceleration/deceleration determined by whether the driver has applied the gas pedal just before the fuel-off command.

A further feature is a method in fuel control in an HEV by providing a brake start routine at gas engine start-up can be activated from vehicle stop by the release of the brake pedal without requiring depression of the accelerator pedal; providing a brake pressure sensor and on a powertrain computer for tracking the pedal force, as well as the rate of pedal application and the rate of pedal release. Wherein from a full vehicle stop (or low-speed vehicle roll operation, with the engine stalled) upon release of the brake pedal, the engine and transmission is turned by the electric motor. A further feature is to provide such method wherein a powertrain computer controls the engine acceleration and speed, and delivers fuel and spark based on engine speed, vehicle speed, throttle position, and intake manifold air pressure (MAP).

A further feature is to provide a method including determining if the engine temperature is above a prescribed threshold and controlling the starter such that the engine does not have to be re-cranked. When the ignition key is turned to run (but not all the way to crank) and PRNDL lever is shifted into drive (D) and the brake pedal is released, the electric motor operating creep the vehicle forward and start the engine as fuel flow commences. In an exemplary embodiment, when the PRNDL level is shifted out of (park) P and an operator foot is on the brake pedal the engine is started.

Yet another feature is to provide such a method including monitoring engine temperature, road grade, and vehicle's turning to adjust the calibration of the hybridization or the level of drive required from the electric motor and from the gasoline engine during such creep forward operation; wherein when the vehicle is cold, the fuel is not turned off and on to optimize fuel consumption since electric motor start only would constitute an unnecessary drain on the battery pack and poor tailpipe emissions; and wherein when the road grade is too great the fuel is not cut off, additionally, the fuel cutoff algorithm is readjusted when making hard turns (at speed) or tight turns (at low speeds) to enhance driveability.

BRIEF DESCRIPTION OF THE DRAWINGS

The present invention will now be described, by way of example only, with reference to the accompanying drawings in which.

DESCRIPTION OF PREFERRED EMBODIMENT

Figure 1:
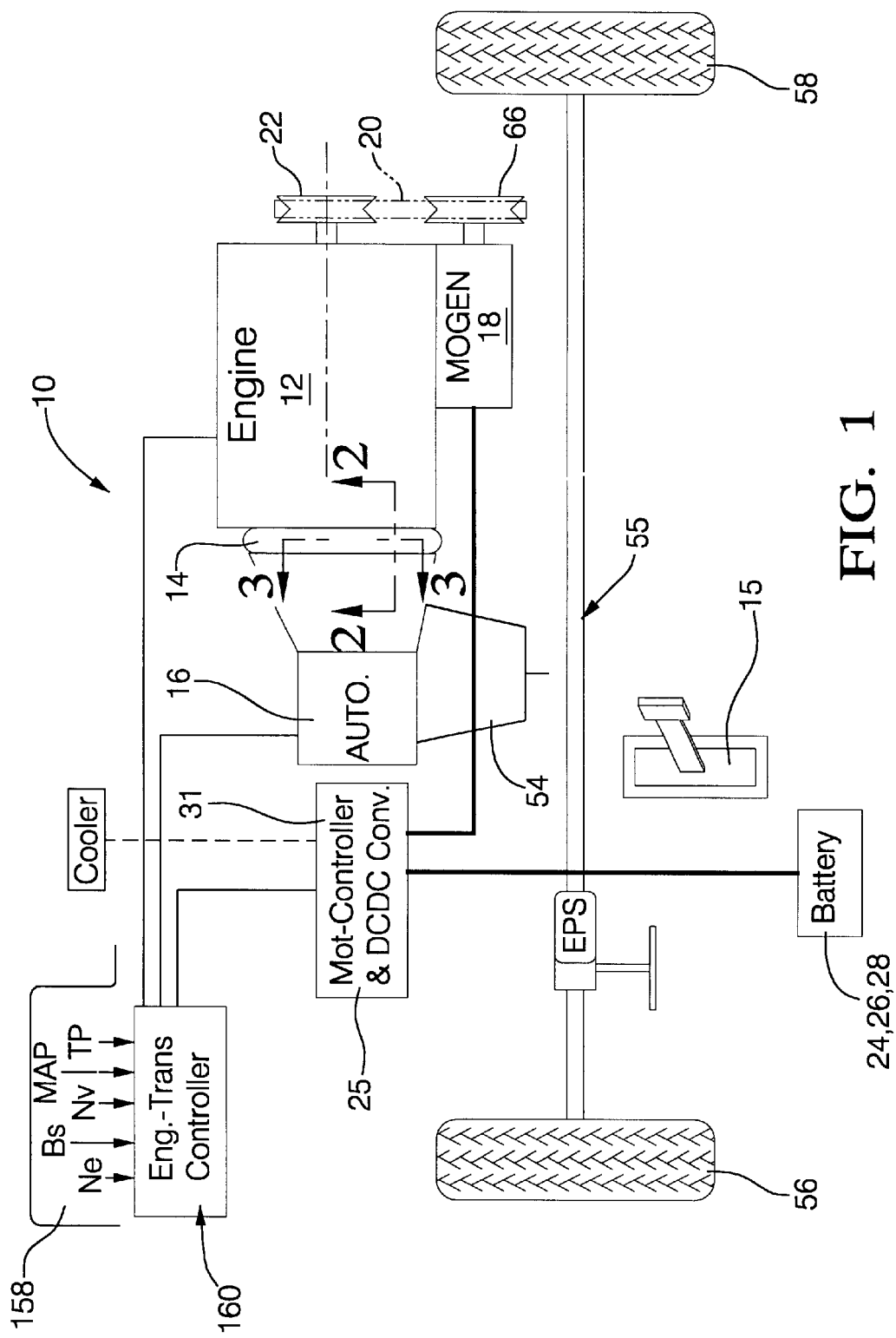
FIG. 1 is a diagrammatic view of a hybrid vehicle drive system including the present invention.

Our invention may be used in the environment described with reference to FIG. 1 for purposes of improving the fuel efficiency of a hybrid vehicle drive system 10 including a gas engine 12, a torque converter 14 and a multi-speed automatic transmission 16. The hybrid drive system 10 further includes a motor generator 18 connected to the front end of the engine by a direct belt drive 20 for providing a drive path to the crankshaft 22 of the engine. The motor generator 18 is operatively associated with a controller 25 for selectively operating the motor-generator 18 during start or to produce generated power for charging an array of batteries 24. An engine and transmission controller 160 is associated with a brake pressure sensor 30 that directs a signal to controller 160. A suitable DCDC converter 31 is provided to direct higher voltage charging power from the motor generator 18 to a low voltage accessory system 33, during generator operation.

The invention includes an over-speed locking and forward speed freewheeling one-way clutch assembly 34 (best shown in FIGS. 2 and 3) operatively connected between the impeller or pump 36 of the torque converter 14 and the turbine 38 thereof for purposes to be described.

The transmission 16 includes known gear sets, clutches, brakes operative to provide a number of drive speed ratios between the engine 12 and a vehicle drive system 55 such as the illustrated differential 54 and drive wheel 56, 58 arrangement with it being understood that the drive wheels can be front or rear drive wheels and that the drive system can be modified to include various forms of power transfer to and from either front or rear drive wheels or both as desired. Multi-speed transmissions 16 are well known and as such a complete description thereof is not required for purposes of understanding the configuration and operation of the present invention.

Figure 4:
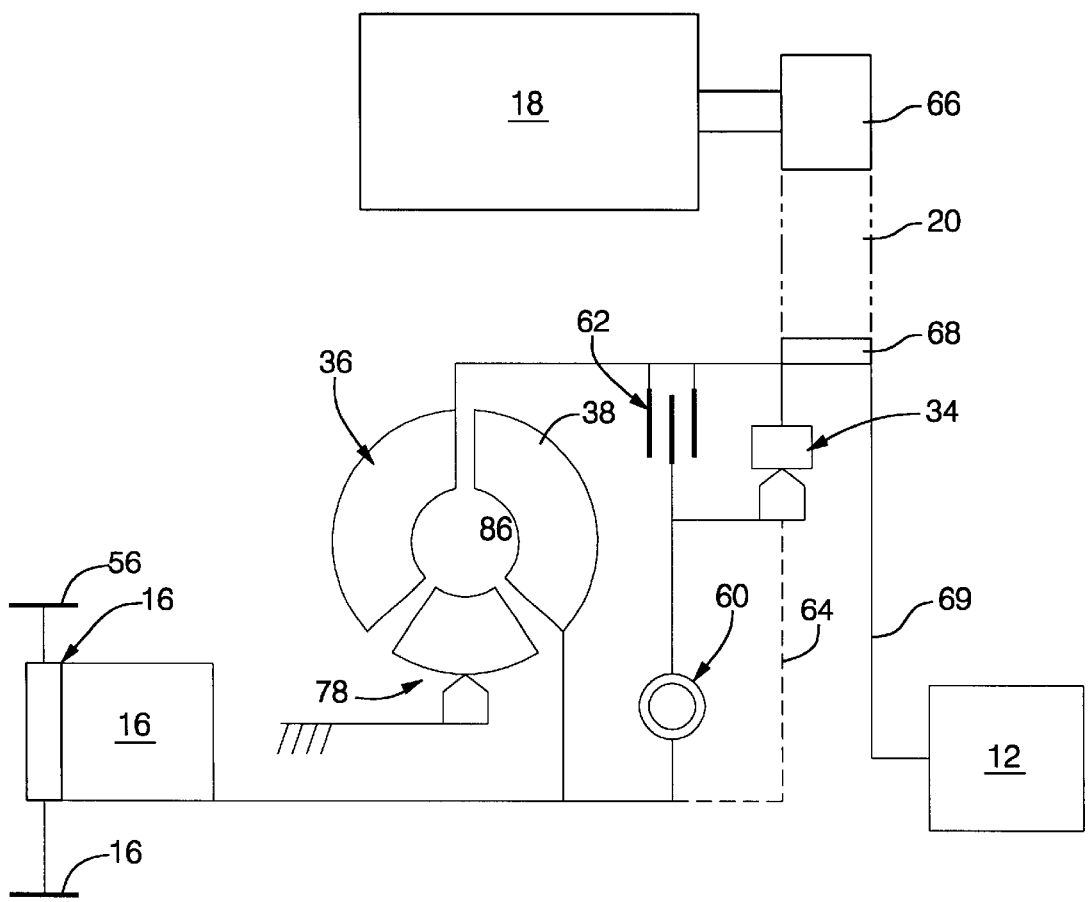
FIG. 4 is a line diagram of a torque converter and transmission for use in the drive system of FIG. 1.

Additionally, as diagrammatically shown in FIG. 4, the reverse lock, forward free wheel one-way clutch 34 is connected between the impeller 36 and the turbine 38 of the torque converter 14. Furthermore, in the preferred embodiment, the direct cross connection of the reverse lock; forward free wheel one-way clutch 34 can include connection to the spring damper assembly 60 for a lock-up clutch 62. The preferred connection is shown in solid line in the diagrammatic showing of FIG. 4 and the alternative direct connection is shown by broken line designated by reference numeral 64 in FIG. 4. Furthermore, as shown, the electric motor 18 is directly connected by belt 20 via a pulley 66 and a direct drive connection 68 directly to the crankshaft of the engine 12, diagrammatically designated by reference numeral 69 in FIG. 4. Hence, during direct forward drive by either conditioning the electric motor 18 to be a starting motor for the engine 12 or during direct forward drive by the engine 12, the one-way clutch 34 is operative to free wheel. However, because of the direct (or damper spring) connection between the impeller 36 and turbine 38 the reverse lock, forward free wheel one-way clutch 34 will lock-up during back drive from the transmission as in the case of vehicle deceleration or coasting while the gear selector is in a forward drive position so as to prevent engine speed drop or stall.

In addition, and as an alternative embodiment the motor generator can be mounted directly to the crankshaft between the engine and the transmission.

Figure 2:
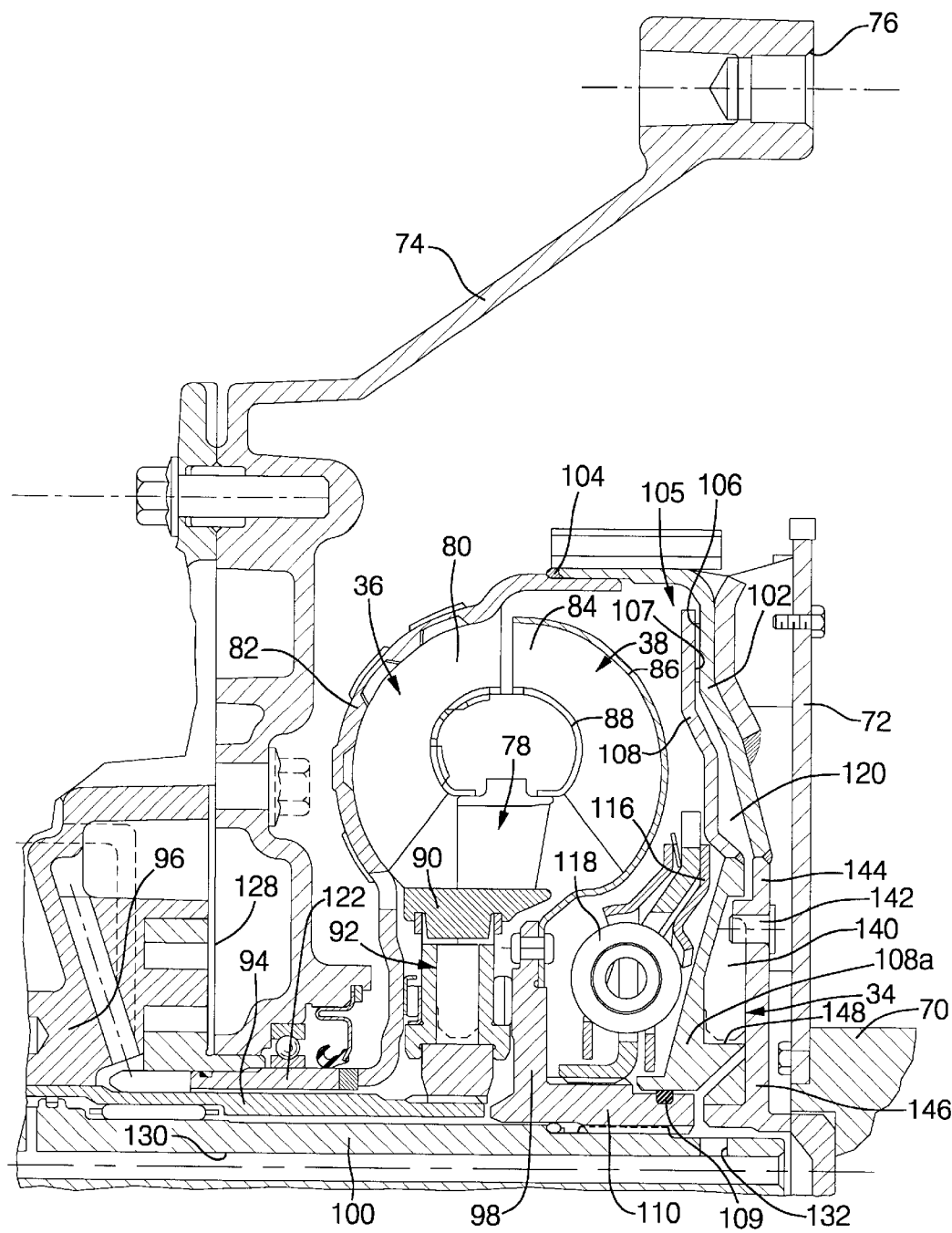
FIG. 2 is an enlarged fragmentary cross-sectional view taken along the line 2—2 of FIG. 1 looking in the direction of the arrows showing a sectional view of the modified torque converter of the present invention.
Figure 3:
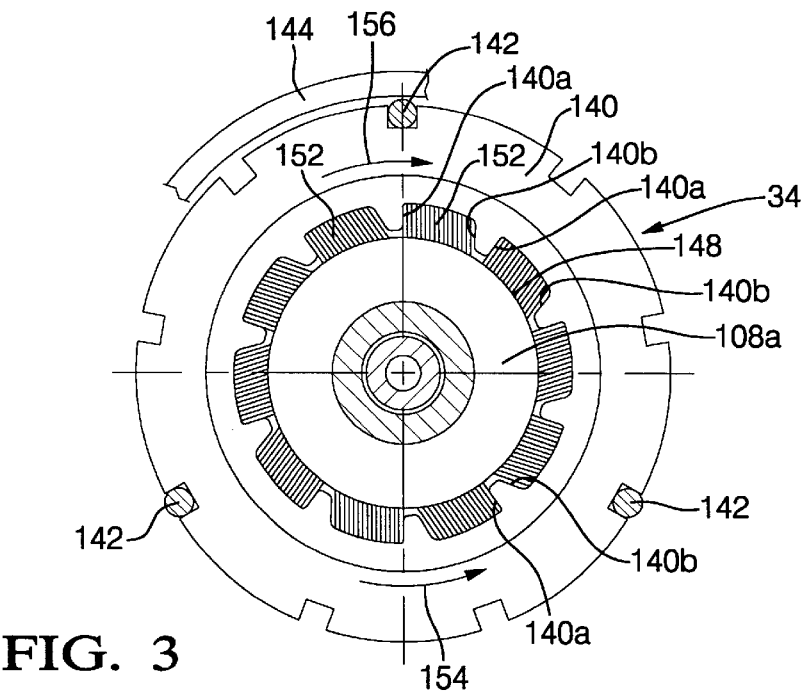
FIG. 3 is an enlarged fragmentary sectional view taken along the line 3—3 of FIG. 1 showing the component parts of a one-way clutch connected between the impeller and the turbine of the modified torque converter.

For a full understanding of the operation of the modified torque converter of the present invention further detail of the torque converter 14 is set forth in FIGS. 2 and 3. Numeral 70 in FIG. 2 designates the end of an engine crankshaft and numeral 72 designates a spring-damped flywheel of the hydrokinetic torque converter 14 that is mounted on the axis of the crankshaft. A torque converter housing 74 is adapted to be bolted to the engine housing at its margin 76.

Torque converter 14 includes the impeller 36, the turbine 38 and a bladed reactor 78. The impeller 36 has toroidal outflow blades 80 secured to the interior of an impeller housing 82. Turbine 38 has radial inflow blades 84 disposed between outer turbine shroud 86 and inner turbine shroud 88. Reactor 78 includes blades supported by reactor hub 90. They are situated between the flow exit section of the turbine 38 and the flow entrance section of the impeller 36. Reactor 78 includes an overrunning brake 92 in the hub 90, which accommodates one-way torque delivery to a stationary reactor sleeve shaft 94, the latter being connected to a support wall 96 which forms a part of the torque converter housing 74.

Turbine 38 has a turbine hub 98 to which the inner margin of the outer shroud 86 of the turbine 38 is secured. Turbine hub 98 is splined to the turbine sleeve shaft 100.

Sleeve shaft 100 transfers torque to the four speed automatic transmission, which is arranged on an axis parallel to the axis of the converter.

Numeral 102 designates the forward wall of the converter housing which is welded at its outer margin 104 to the impeller housing 82 and is associated with a known type torque converter lock-up clutch 105. The clutch 105 is defined by an annular friction surface 106 on the wall 102 at a radially outward location. That surface is adapted to be engaged by the friction surface 107 of a lock-up clutch piston plate 108, the inner margin 108a of the piston plate 108 is mounted on and sealed by an O-ring 109 on an extension of the turbine hub 98, shown at 110, and is adapted to move axially with respect to the turbine hub 98.

The spring damper assembly 60 includes a damper driven plate 112 splined at 114 to the turbine hub 98. A damper driving plate 116 is secured to a radially outward portion of the lock-up clutch piston plate 108. Damper springs 118 interposed between the plates 112, 116 establish a resilient connection between driving plate 116 and the driven plate 112. For an understanding of the general configuration and mode of operation of a damper of this general type, reference may be made to U.S. Pat. Nos. 2,574,573 and 4,304,107 as well as previously mentioned U.S. Pat No. 4,509,389.

The clutch piston plate 108 is urged into engagement with the converter housing 102 by the circuit pressure in the torus circuit for the converter. When control pressure is supplied to the annular space or cavity 120 between the piston plate 108 and the wall 102 of the converter housing, fluid flow is passed across the friction surfaces of the converter housing and the piston plate, thereby releasing the clutch. The fluid that passes across the friction surfaces in a radially outward direction is added through the flow normally distributed through the torus circuit, and the combined flow then passes out from the torus circuit through the flow return passage.

A transmission pump drive shaft 122 is splined at 124 to an extension 126 on the outer shroud of the impeller 36. A control pump 128, as seen in FIG. 2, is adapted to be driven by drive shaft 122.

A control oil pressure distributor passage 130 is defined by the central opening of the shaft 96. Control oil pressure is distributed through passage 130 and through a radial passage 132 formed in the clutch cylinder member 78. Radial passage 132 communicates through a passage 133 in clutch plate piston 108 with the pressure chamber 120.

By controlling the pressure in the cavity 120, the engaging force of the friction surfaces 106, 107 can be controlled. The circuit pressure establishes a pressure force on the piston plate 108 to apply the clutch 105. The control pressure in the cavity 120 releases the clutch. The pressure ratio across the piston plate can be controlled to establish a continuous slipping of the clutch disks, thus reducing engine torsional disturbances and increasing the torque transmitting capacity and torque multiplication efficiency. A portion of the driving torque that is not distributed to the clutch disc is transmitted hydrokinetically through the converter to the turbine sleeve shaft 100.

The feature of the torque converter clutch assembly 105 connected between the impeller or pump 36 of the torque converter 14 and the turbine 38 provides a direct drive during operator selected multi-speed drive depending upon the position of a gear shifter 15 schematically shown in FIG. 1 and the response thereto within the transmission 16. As a consequence, the torque converter 14, in the forward direct drive operation, will provide a desired torque transfer operation until the drive speed of the transmission is synchronized to that of the gas engine 12. At this point a converter clutch actuator (not shown) is operative to release the pressure in the cavity 120 so as to cause the torus pressure to shift the piston 108 into a locked engagement with the front wall 102 of the torque converter 14. This will result in a direct drive (possibly some slip as applied and if desired during lock-up) between the impeller and turbine so that there will be direct torque transfer between the engine and the transmission.

When combined with an electric motor generator 18 having its rotor connected directly to the crankshaft of a vehicle such an arrangement can take advantage of back drive from the vehicle wheels to the engine as occurs during vehicle coasting operations to drive the engine crankshaft 69 to drive the rotor of the generator 18 during a regenerative phase of operation where the controller 25 conditions the motor generator 18 to direct charging current from the motor generator 18 to charge the batteries 24, 26, 28. During such coasting, in addition to using the vehicle momentum to recharge the batteries, it is desirable to cut-off fuel flow to the gas engine by use of an aggressive fuel control algorithm. Such operation, however, when using known torque converter designs is not optimal in that the fluid coupling action of the torque converter and/or slip in the lock-up clutch 62 can cause the engine speed to drop below the transmission coasting speed and when fuel is cut-off, the engine can stall. In such cases the battery charge produced during coasting and the battery charge required for the electric starter motor can result in a net energy loss. Hence, the advantage of a motor generator arrangement is not fully realized.

By use of the modified torque converter of the present invention including a one-way clutch 34 that immediately locks on sensing coasting (overdrive) conditions and one that is operative to directly connect the turbine 38 to the impeller 36 will result in a drive operation in which fuel can be aggressively cut-off without engine stall or without engine speed drop that must be brought up to speed through the torque converter lock-up clutch such as described herein.

In the case of the present invention, as shown in FIG. 3, the one-way clutch 34 includes an outer race 140 connected by circumferentially located pins 142 to the outer end 144 of a shaft bearing support 146. When reverse drive occurs, an inner race 148 defined by an annular shoulder in lower piston part 108a is connected by sprag elements 152 directly (without any slip) to the lock-up clutch piston plate 108 that in turn is directly connected through the spring damper assembly 60 to the turbine hub extension 110 that is splined to the output shaft from the torque converter. Hence reverse or back drive will pass to the inner race 148 that in such drive direction is locked by sprag clutch elements 152 at flat radial surfaces 140a on the outer race 140 of the one-way clutch. The outer race 140 also includes surfaces 140b inclined with respect to the surfaces 140a to cause the sprag elements to release to allow freewheeling action between the outer race 140 and inner race 148 during forward drive shown by the arrow identified by reference numeral 154. In reverse drive shown by the arrow identified by reference numeral 156, the transmission will directly drive the engine crankshaft without any fluid coupling slip at the torque converter. Hence, the objective of battery regeneration during vehicle coasting is possible since the electric motor/generator 18 is directly connected (always) to the crankshaft 69 of the engine. At the same time fuel flow to the engine can be terminated. When the gas pedal/throttle position is zero or a braking signal is directed from the braking sensor 30 to the controller and processed by a fuel management method to be described. Hence, the objective of reduced fuel consumption is possible since anytime braking/coasting operations are sensed fuel flow to the engine can be terminated. The net result is full use of vehicle momentum for regeneration and full termination of fuel consumption during all vehicle coasting.

The present invention, in addition to the motor generator controller 25, the power train controller has an engine controller that includes a dash board or control panel indicator such as a light or a chime indicative of the hybrid system being active as shown by reference numeral 158 in FIG. 1. The power train controller includes an engine and transmission control microprocessor 160 that is inputted with engine output speed Ne, transmission states, vehicle speed Nv, intake manifold air pressure MAP, brake sensor signal, and throttle position TP and is programmed in response to such signals to deliver fuel and engine spark to control engine acceleration and speed.

Figure 5:
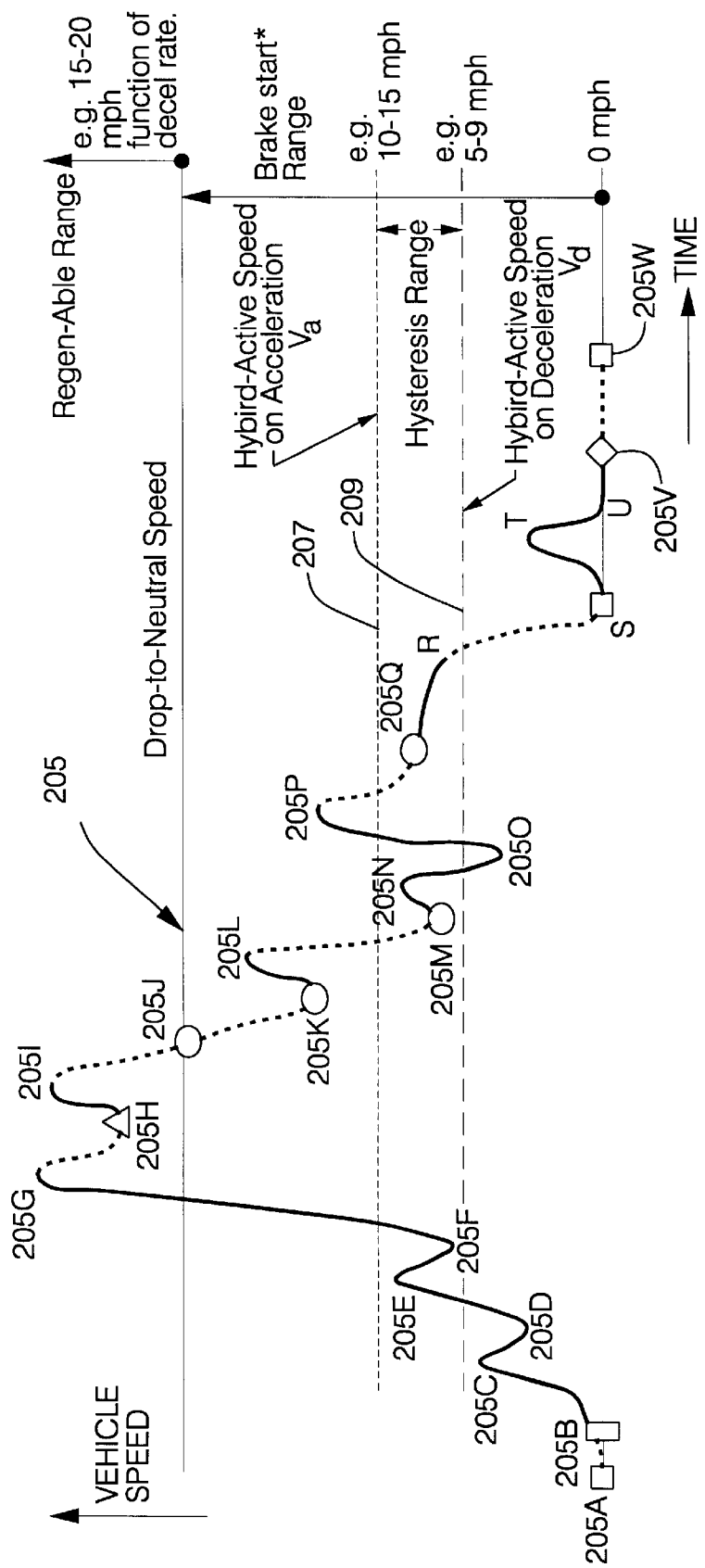
FIG. 5 is a schematic of a fuel control sequence of an exemplary embodiment of the invention.

A schematic of another and preferred fuel control sequences is a function of vehicle speed is shown in FIG. 5. It shows a hysteresis speed range that includes a hybrid-active speed initiation range on acceleration shown on broken line at 207 (e.g. a range of 10 to 15 mph). A hybrid-active speed on deceleration at speed range (e.g. 5 to 9 mph) a shown by broken line 209 in FIG. 5. The control sequence in FIG. 5 also includes a brake start speed range that it is between zero mph and a speed above the hybrid-active speed on acceleration (shown by Arrow 205 in FIG. 5).

The drop-to-neutral speed in the control sequence in FIG. 5 can be in the range of 15 to 20 mph and is a function of deceleration rate as will be described. The regen-able speed range covers vehicle speed above the drop to neutral speed.

A graphic representation of the control modes of the present invention is shown in FIG. 5 as including representative points on a vehicle speed time curve designated by reference numeral 205. At the beginning of the representatively illustrated schematic of one fuel control sequence obtainable with the fuel control sequence obtainable with the fuel control algorithm of the present invention, the vehicle speed is zero at point 205A on the curve 205. At this point the vehicle is at rest and the fuel is off and when the brake pedal is released the electric motor 18 will be conditioned by the controller 25 to draw electrical energy from the battery pack so as to cause the engine 12 to turn and thus drive the crankshaft of the vehicle and the connected drive train components including the torque converter clutch 105 and the multi-speed transmission 16 through a creep speed range shown between points 205A and 205B. Accordingly, this operation can be initiated by merely releasing the brake pedal.

Thus, in the embodiment of FIG. 5, at 205A, the vehicle is at stop with the fuel off and as the brake is released to electrically turn the engine. The electric motor 18 creep drives the vehicle to point 205B where fuel in spark are delivered to the start the engine. Fuel flow and spark is provided between points 205B and 205G. During this mode throttle application overrides the PID control of the electric motor as well as brake application. At speed range of 205G to 205H the fuel-off regenerative operation is maintained. During this time period the vehicle accelerates to a point above a hybrid-active speed. In order to start the engine after its fuel has been cut off, and the vehicle is in a regenerative braking operation, the engine can be restarted by depressing the accelerator pedal, and delivering fuel and spark thereto at 205H. If the engine RPM is lower than an operable level, the control for the generator or electric motor can be operated so as to help start the engine by use of the electric motor 18.

Once the engine is started, between points 205H ad 205I fuel is maintained on. As shown between points 205I and 205J, fuel can be controlled off and a brake regeneration operation can occur. At point 205J, the vehicle operation is such that the transmission drops to its first gear range and the first gear's forward locking overrun clutch is operative to produce drive train operation equivalent to operation in neutral.

In order to further conserve fuel, between points 205J and 205K the fuel is maintained off and the vehicle can coast with the engine stalled.

Once the vehicle decelerates below the predetermined drop-to-neutral speed, in order to restart the gasoline engine with the electric motor the brake pedal is released and fuel is maintained on between points 205K and 205L. If both the brake pedal and accelerator pedal are not applied when entering the drop-to-neutral speed, fuel and spark are delivered to restart the combustion in the already spinning engine. The fuel off coast mode can reoccur between points 205L and 205M. At point 205M the vehicle speed is low, "slightly above zero miles per hour" and when the brake is released the electric motor will be operated to start the engine with fuel being maintained on between points 205M and 205N; and 205N and 205O; 205O and 205P.

At point 205V, the vehicle is stopped with engine idling and fuel on. At this point fuel can be shut off by bottoming out the brake pedal, so that between point 205V and 205W the vehicle is subject to a fuel off stop. At point 205W equivalent to point 205A the vehicle can be restarted electrically by release of the brake pedal. In accordance with certain aspects of the invention the number of electrical restarts that are allowable without exceeding the active speed so as to be able to produce regenerative braking action, limited to a number that will sustain a battery state of charge required for vehicle operation.

At point 205H, when the gas pedal is depressed the engine is started by delivering fuel and spark and the electric motor 18 helps start the engine if the engine RPM is lower than optimal level.

Fuel is maintained on as the vehicle accelerates between points 205H and 205I. If the vehicle is braked at this point, fuel be shut off and a control sequence will be operated to cause the electric motor 18 to enter a regenerative braking phase of operation. Some regenerative braking is initiated upon release of the accelerator pedal even with the fuel on.

As the vehicle continues to decelerating to point 205J, the transmission is controlled to drop-to-neutral e.g. drop to its first gear and the vehicle coasts off the first gear's forward-locking overrun clutch.

The fuel will remain off as the vehicle so coasts with the brake pedal depressed, the fuel remain off between points 205J and 205K with the engine stalled. In order to start the engine during this phase with the electric motor 18, the brake is released. Fuel will remain on between points 205K and 205L so that the vehicle can accelerate; between points 205L and 205M fuel is maintained off as the vehicle coast down in speed with the engine stalled. Again if desired, in order to accelerate, the engine can be started with the electric motor on the release of the brake. From points 205M through 205P fuel is maintained on. If the brake is reapplied fuel will be off between points 205P to 205Q and the vehicle coast with the engine stalled. At 205Q the engine can be started by the electric motor 18 upon release of the brake.

The Brake Pressure Sensor (BPS) signal is read by the engine-transmission controller. At points 205K, 205Q, 205S, the engine-trans controller commands the motor-generator system to start the gas engine when the driver releases the brake up to a critical BPS value. This critical BPS value is a function of vehicle speed.

Fuel can remain on during the decrease at speed from 205Q to 205R with no application of the gas pedal, while the vehicle continues to decelerate.

Between points 205R and 205S fuel is shut off upon brake application since 205R is above Vd, and the vehicle continues to coast with the engine stalled as it decelerates to a stop at point 205S. At this point, with the fuel shut off, the release of the brake will electrically turn the engine and an immediate application of the gas pedal will command fuel delivery to the engine. Between points 205S to 205V fuel is maintained on. At point 205V at stop with the engine idling with the fuel on, the fuel can be shut off by bottoming out the brake pedal so that there will be a full fuel off stop between points 205V and 205W.

As in the case of the first embodiment the vehicle can be restarted electrically by release of the brake pedal.

Figure 6A:
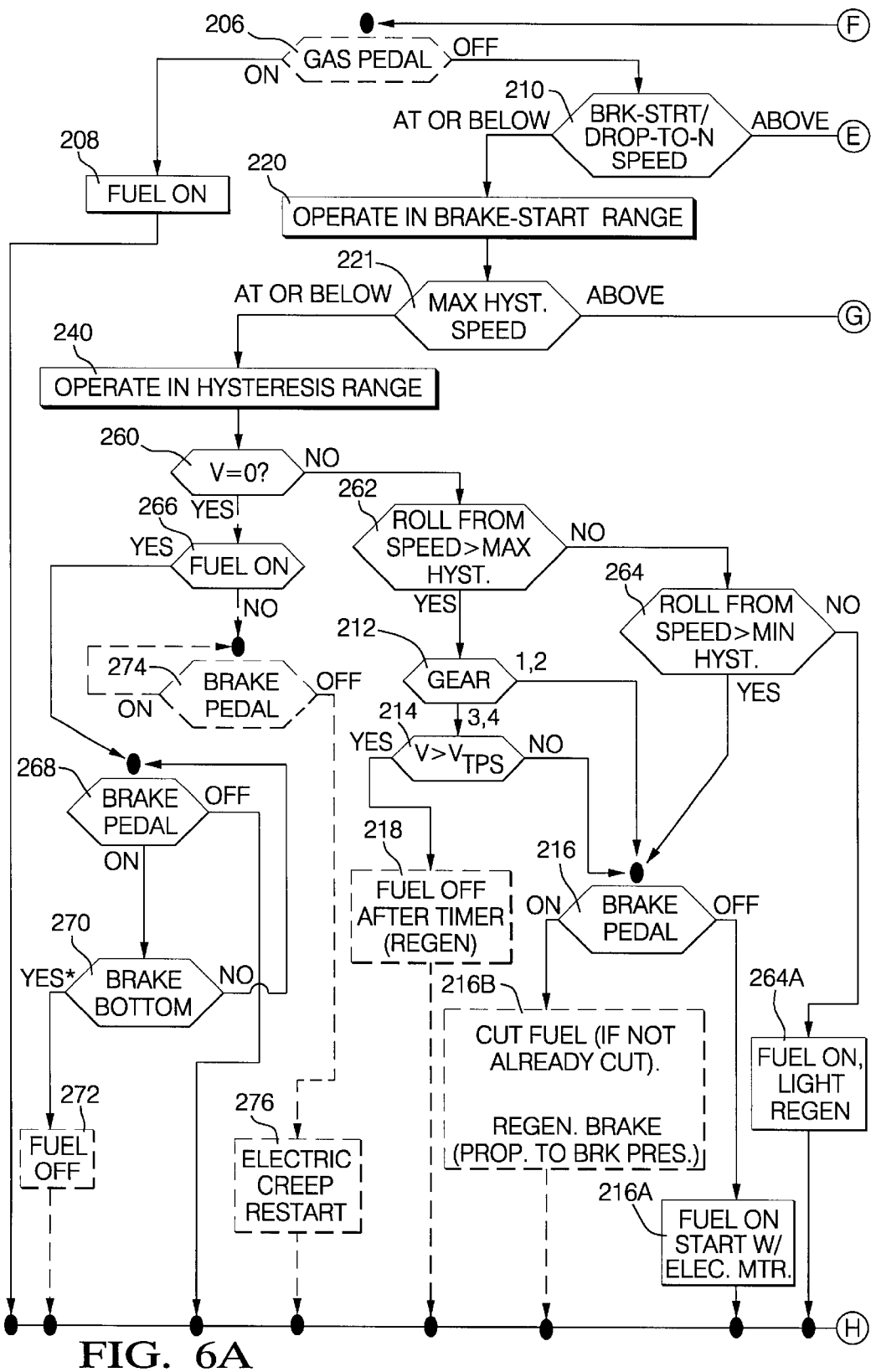
FIGS. 6A and 6B illustrate a flow chart of a program for operating the embodiment shown in FIG. 5.
Figure 6B:
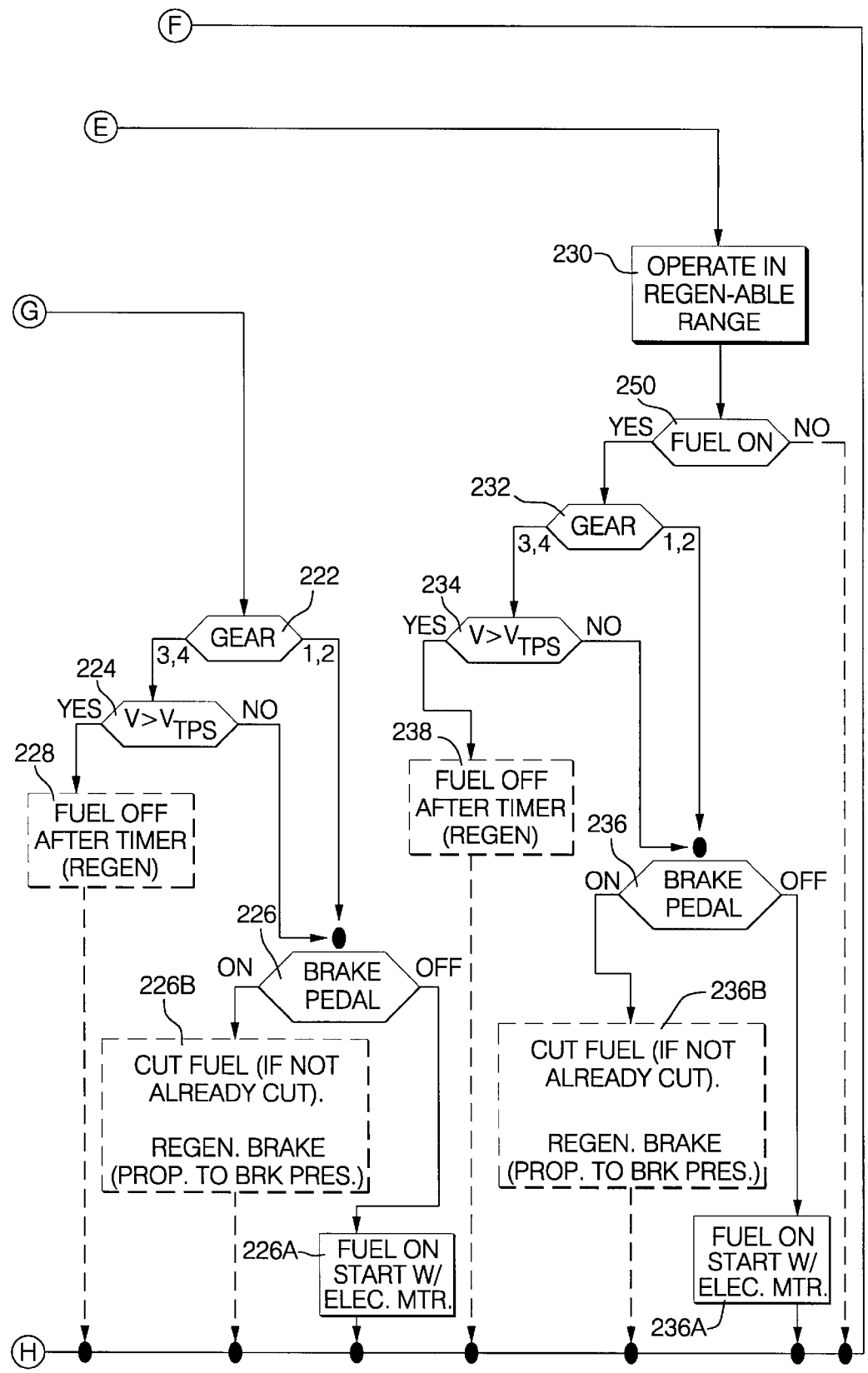

The preferred embodiment of the invention, includes a flow-chart of the modified control as illustrated in FIG. 6. It includes an operate in brake start range 210 and can operate in regen-able range 230 and an operate in hysteresis range 240.

FIG. 6 shows fuel on engine states in solid line and fuel off engine states and broken line. As in the previous embodiment, fuel cut off in the various road speed states is initiated by brake pedal operation and or operation of a gas pedal.

The controls program is initiated by the gas pedal position at decision point 206. When the gas pedal is on, the vehicle engine the vehicle engine will be supplied with fuel as shown at 208.

When the gas pedal is off, a determination is made (decision block 210) as to whether or not the brake start speed is above or below drop-to-neutral speed corresponding to operation of the vehicle drivetrain has speed where the transmission is in first-gear and the freewheeling clutch 34 is engaged. If the speed is at or below the drop-to-neutral speed, the control sequence enters the operate in brake start speed range 220.

The control sequence enters an operate in hysteresis speed range 240 of the vehicle speed is determined (at decision point 221) to be at or below a maximum hysteresis speed Va shown in FIG. 5. If the vehicle speed is above the drop-to-neutral, the vehicle operate in the regen-able speed range at 230.

Another aspect of the invention is that speed above each of the speed ranges, 220, 230 and 240 when the multispeed transmission 16 is set in a higher gear range in the vehicle is operating above a critical speed, for example, 25 mph, release the gas pedal can initiate an engine fuel off sequence. The system delays the beginning of the fuel cut off sequence. The system is operative to shut off fuel flow to one cylinder at a time in the engine 12 to provide a smooth deceleration feel.

At lower gear settings first and second and at a speed under the critical speed, fuel cut off is initiated by the application of the brake pedal as shown in FIG. 6.

The determination of whether the initiation of fuel cut off is by brake application or gas pedal operation in shown at flow-chart gear conditional boxes 212, 222 and 232 and at critical velocity conditional boxes 214, 224 and 234 respectively. The brake pedal termination of fuel is shown at conditional boxes 216, 226 and 236. The gas pedal termination of the fuel under each of the operating speed ranges is shown at conditional boxes 218, 228 and 238.

In each case, if the brake pedal is off fuel will remain on as shown at 216A, 226A, and 236A, with the controller programmed to start the engine with electric motor 18 is stalled. If the brake pedal is depressed "on" the fuel will be cut off as shown at conditional boxes 216B, 226B and 236B. In each case fuel will be cut if not already cut by operation of the gas pedal, and the system will be conditioned so that the electric motor 18 will provide regenerative breaking and charging of the battery pack proportional to the brake pressure.

Under the operate and regen-able range 230 the decision points of gear setting, speed range and brake pedal operation are determined by monitoring fuel flow as indicated by conditional boxed 250. When the fuel is on, the aforedescribed sequence will occur; if the fuel is off such operation is bypassed.

Additionally in the operating hysteresis speed range 240, a vehicle start mode includes monitoring the vehicle speed as shown at conditional boxed 260 on determining whether or not the vehicle velocity is equal to zero or greater than zero. If it is not zero, a determination is made at conditional box 262 as to whether or not the vehicle speed is greater than the maximum hysteresis speed. If it is not greater than the maximum hysteresis speed, a further determination is made at conditional box 264 as to whether or not the vehicle speed is greater than the minimum hysteresis speed. If not, the fuel remained on as shown at 264A with light regeneration taking place as in the previous described control sequences. If the roll from start is greater than the minimum hysteresis speed the control mode will enter the brake pedal controlling subroutine has previously described at 216.

If the roll from speed is greater than the maximum hysteresis speed, the control sequence will enter the subroutine at 212 of the previously described control.

If the vehicle is operating in the hysteresis range 240 at a zero velocity state, determination at the conditional box 266 establishes whether the fuel is on or off. If the fuel is on, a subroutine is entered in which the brake pedal position is determined as shown at conditional box 268. If the brake pedal is off, the control sequence is re-entered. If the brake pedal is on, a determination is made at conditional box 270 whether the brake pedal is bottomed. If yes, the fuel is turned off at 272. If no, the brake pedal position is rechecked. However, if during a nonzero speed brake application engine firing is resumed and if the critical brake vacuum level is exceeded.

If fuel is not on during this operating mode, the brake pedal position is checked at conditional box 274. If the brake pedal is released, the system is conditioned to cause the electric motor 18 to produce an electric creep restart at 276 which corresponds to the previously illustrated start sequences at point 162A and point 205A in the embodiment of FIGS. 8 and 9, respectively. In the case of brake bottoming being sensed at 270, if the brake pressure sensors signals that the brake pedal is bottom at a zero speed idle condition the fuel flow is cut off.

As shown in FIG. 6, the hybrid-active speed is a speed that the car needs to exceed for hybrid system to become active so that the fuel cut off can be enabled The illustrated embodiment has a speed hysteresis designed into the hybridactive speed. Thus, there is a hybrid active speed for acceleration Va and another for deceleration Vd. The quantification of acceleration/deceleration is determined by whether the driver had applied the gas pedal just before the fuel off command. An example of this operation occurs if the vehicle accelerates from a stop, the vehicle must exceed Va (e.g. 10 mph) as shown in FIG. 5 in order for the fuel cut off to be enabled. That is, when driving from a stop to 9 mph, there is no fuel shutoff with brake application. But once the 10 mph level is exceeded, the application of the brake pedal will initiate fuel cut off as shown in the flowchart control of FIG. 6. This is also graphically illustrated in FIG. 5 at point 205D through 205H or points 205M through 205Q. As previously discussed, the exception to the rule is, if the driver bottoms out the brake pedal at a full stop. Also given a value of Va during acceleration, the Vd during the following deceleration is set to a lower speed (hysteresis). If the vehicle is decelerating with fuel off with a brake pedal applied, and the driver releases the brake pedal below the drop to neutral speed, the engine will start by conditioning the electric motor. After this brake start the driver may want to decelerate again and reapplied the brake pedal. The minimum speed at which the driver can cut fuel by the brake pedal is a deceleration hybrid active speed Vd (or the lower hybrid-active speed).

The hysteresis band is implemented for drivability and improved fuel economy. As an example, suppose Va=10 mph and Vd=7 mph. The driver accelerates from 0 mph to 9 mph on gas power and applies the brakes. The engine will continue to fuel. However, if the driver accelerates from 0 to 11 mph and applies the brake pedal, the fuel is cut (points 205 D-E-F-G-H or 205 M-N-O-P-Q in FIG. 5). If the driver decelerates from 10 mph with fuel off, with brake applied, and releases the brake at some speed under the drop-toneutral speed, the engine will restart (point 205Q). If the driver reapplies the brake pedal at 8 mph (above Vd), the fuel will be cut (point 205R). However, if the driver had applied the brake pedal at 6 mph (below Vd), the fuel would not be cut.

The Va and Vd hysteresis band (or just Va) ratchets up with the number of fuel on/off cycles performed. The Va and Vd are reset to their original values once a higher critical speed (e.g. 35 mph) is exceeded for some time or the battery state-of-health is deemed adequate.

In summary the initial fuel control routines offer the following advantages:

With the engine restart (from vehicle stop or low-speed coasting) activated by the release of the brake pedal, the engine can be restarted and set at idle speed, and thus configured to be ready to creep or accelerate the vehicle. The present invention has an engine computer that tracks the release of the brake pedal, and when certain brake pressure is reached thereby causing the engine to be turned by the electric motor and engine firing is initiated after the power train computer detects conditions met for several parameters as set-forth herein, including engine speed and MAP, to ensure a clean start. The arrangement avoids the prior art disadvantages of operating an electric drive during extended creeps to undesirably dissipate much of a small battery charge. A further prior art disadvantages is avoided since the creep or low-speed coasting and reset of engine to idle conditions is obtained without the additional need to depress the accelerator pedal causing a lag in the engine start process (and in vehicle launch).

In some hybrid vehicle powertrain systems, an electric motor/generator system replaces the conventional starter motor and alternator. The motor/generator is used to propel the vehicle, start the engine and provide a source of energy through regenerative braking.

Figure 7:
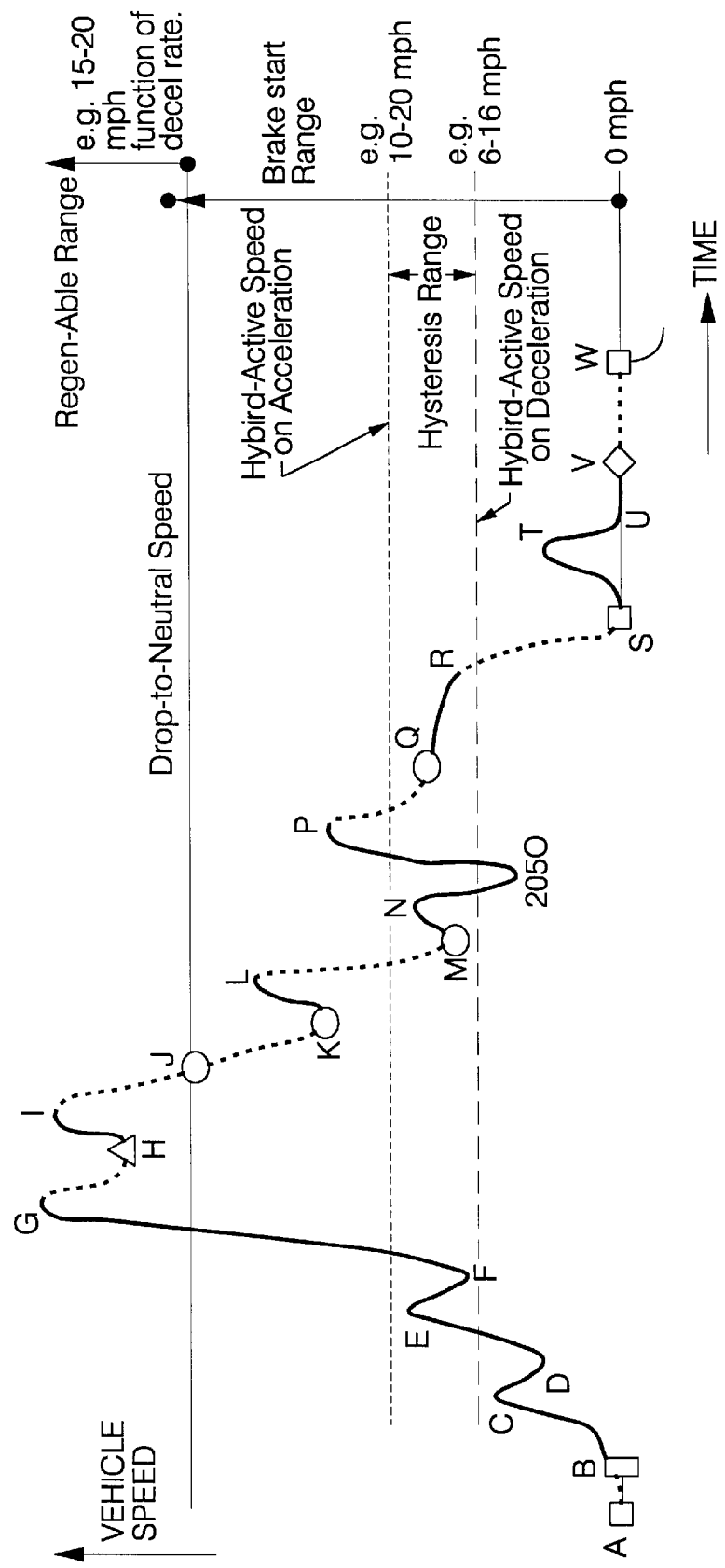
FIG. 7 is a graph illustrating the fuel control sequence of the instant application as a function of vehicle speed.

The fuel-control sequence of the present invention as a function of vehicle speed is shown schematically in FIG. 7.

During vehicle startup the vehicle is similar to a conventional vehicle and no hybrid features are activated until the transmission is shifted into drive, and a minimum speed (hybrid-active speed in FIG. 7) is reached, approximately 12 mph. When the vehicle is decelerating or is stopped, the fuel flow to the engine is shut off in order to improve fuel economy. The fuel shut-off can be initiated by the brake-pedal application, or from an extended coast with no gas-pedal application (points G, I, L in FIG. 1). The fuel cut-off is performed by ramping the spark and cutting the fuel (cylinder by cylinder) to balance smoothness (function of the engine RPM and vehicle speed) and emissions.

A control system 160 is implemented to enable smooth, fuel-off decelerations and reaccelerations. The first component of this system is the electric downshift. During fuel-off decelerations, it is still imperative that the transmission be in the desired gear for drivability, especially, when the driver steps back on the gas pedal to reaccelerate the vehicle. However, since the engine is not firing, the idle-air-control (IAC) motor that is conventionally used to match engine speeds (e.g. from fourth to third gear) has no authority.

Therefore, to seamlessly perform a downshift, the motor/generator 18 is used to electrically spool the engine up to synchronizing speed between the release of the higher gear clutch and engagement of the lower gear clutch. The transmission system of the present application has a clutch-to-clutch architecture that is shifted similarly to a manual transmission and that facilitates this strategy. The speed regions where the electric downshift is performed are segments GH and IJ in FIG. 7 or when the vehicle speed is greater than the drop-to-neutral speed.

If the battery state-of-charge is low, or if the downshft has to be performed at a higher speed than usual (e.g. descending a steep hill), the engine is started during the speed synchronization to aid the electric motor.

With the transmission in proper gear during the deceleration, the driver can step back on the gas pedal to reaccelerate similar to a conventional powertrain or non-hybrid powertrain. For engine speeds at which compression bobble is not objectionable (e.g. 600 RPM's and above for moderate deceleration rates), the reverse-freewheel torque converter back-drives the engine (segments GH and IJ in FIG. 7) so that upon gas-pedal tip-in (point H in FIG. 7), the fuel and spark are ramped in to briskly reaccelerate the car on power provided by the internal combustion engine. The fuel and spark ramping is controlled such that the torque increase from fuel-off operation to gas-powered propulsion mimics that of a conventional powertrain's tip-in torque response.

During a fuel-off deceleration, when the engine reaches a low enough speed that compression bobble is objectionable, the powertrain computer releases the clutch of the engaged gear, dropping the transmission to effectively be neutral and, permitting the engine to stall (point J in FIG. 7). If the brake pedal is released at any point along I-J, and the vehicle continues to decelerate (fuel-off) with no other pedals being applied, the fuel and spark will be delivered just before the drop-to-neutral speed is reached in order to restart the engine with possible assist from the electric motor.

This "drop-to-neutral speed" is chosen as lowest possible to improve drivability. The drop-to-neutral speed is set slightly less than the brake-start speed, so that the vehicle can be operated with virtually no throttle response delay (due to having to respool the engine backup to speed from stall) over its entire speed range.

The drop-to-neutral speed is programmed to be a function of deceleration rate. Tests have shown that the release speed can be lowered by several hundred RPM for mildly abrupt decelerations ($\geq 0.3$ g) relative to gentle coast downs. The deceleration rate is measured by a wheel speed sensor and/or a brake pressure sensor.

During vehicle operations where the air-conditioning (AC) system is on, the hybridization system is modified. For a large portion of the deceleration, the engine is being back-driven by the reverse-freewheel torque converter so that the AC compressor is still being energized. However, since the system cannot know a priori how long the vehicle will be stopped (e.g. at a stoplight or stop sign), the engine is refired just before the drop-to-neutral speed, letting the engine idle at a stop like a conventional powertrain in order to provide air-conditioning comfort to the vehicle's occupants.

During a fuel-off deceleration with the air-conditioning system on, the air-conditioning compressor clutch is disengaged just before an electric downshift takes place and reengaged once the downshift is complete. This strategy is implemented to reduce the load on the motor/generator during the spooling up of the engine speed.

Referring now to FIG. 7, which illustrates possible aspects of the hybrid vehicle's fuel-control sequence as a function of vehicle speed. At point A, the vehicle is stopped with the fuel supply to the internal combustion engine shutoff. From points A-B the vehicle launch is facilitated by the electric traction drive. At point B, fuel and a spark is delivered to start the internal combustion engine. From points B-C, C-D, D-E, E-F, F-G the fuel supply is on. (Throttle application overrides the PID (proportional integral differential system for smooth start with release of brake but no acceleration pedal) control of electric motor, and brake application). B-C, C-D, D-E, E-F, F-G: regular internal combustion car.

From points GH the fuel is off and the vehicle is in a regenerative mode. At point H the internal combustion engine is started by delivering fuel and spark to the engine, this can be facilitated by the tip into the gas pedal by the vehicle operator. However, the electric motor can be used if the engine RPM is lower than optimal. From points H-I the fuel supply is on. From points I-J the fuel is off and the vehicle is a regenerative mode, with the engine driven by the reverse freewheel torque converter. If the brake pedal is released at any point between I and J, and the vehicle continues to decelerate with the fuel off and no other pedals are applied, the fuel and spark will be delivered just before the drop-to-neutral speed is reached in order to restart the engine with possible assist from the electric motor.

At point J the transmission drops to effectively neutral. In actuality the transmission drops to first-gear and coasts off the first-clutch overunning clutch placing it effectively in neutral. From points J-K the fuel is off and the vehicle is coasting with the engine stalled. At point K the internal combustion engine can be started upon brake pedal release. The brake pressure sensor (BPS) value threshold for start is x% of BPS max, x is a function of BPS apply rate.

From points L-M the fuel is off and the vehicle is coasting (engine stalled). At point M the internal combustion engine is started with the electric motor upon brake release. The fuel is also on from points M-N, N-O and O-P. From points P-Q the fuel is off and vehicle is coasting the engine stalled.

At point Q the engine can be started with the electric motor upon the brake release. From points Q-R the fuel is on, however, there is no application of the gas pedal and the vehicle continues to decelerate. At point R the fuel to the engine is shutoff upon brake pedal application. From points R-S the fuel shutoff and the engine is stalled.

At point S the vehicle is that stopped with the fuel off and upon immediate application of the accelerator pedal, with or without the release of the brake pedal, the engine is turned electrically and the engine is fired. Accordingly, from points S-T, T-U and U-V the fuel is on At point V the vehicle is at stop and at this point the bottoming out of the brake pedal will actuate a sensor causing the fuel supply to be shut off. However, the number of restarts allowable without exceeding the hybrid-active speed is limited to sustain battery state of charge. A battery state of charge algorithm can be incorporated into the control system to provide a battery state of charge management protocol.

From points V-W the fuel is off and the vehicle stops. At point W the vehicle can be restarted electrically with the release of the brake pedal. This is facilitated by a sensor, which is actuated by the movement of the brake pedal.

In order to shut off the fuel supply to the vehicle, the following variables are considered: present gear position of vehicle, BPS value, vehicle speed and TPS (Throttle Position Sensor). For example, and in order to shut off the fuel supply to the internal combustion engine with application of the brake pedal and if the vehicle is and first or second gear, the BPS value must be >0.

If the vehicle is in a third or fourth gear and the vehicle speed is less than or equal to 25 mph, the fuel can be shut off via a BPS>0. If on the other hand the vehicle is in third or fourth gear and the vehicle speed is >25 mph, the fuel can be shut off when TPS equals zero.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for controlling a hybrid vehicle drive comprising an internal combustion engine and an electric motor generator connected to a crankshaft of the internal combustion engine by a direct drive belt and wherein the electric motor is utilized to charge batteries during vehicle deceleration/coasting operation and during regular cruising if battery charge is low comprising the steps of:
    a) monitoring a vehicle speed;
    b) providing a brake pedal and a brake switch responsive to a brake pedal pressure and position for producing input signals;
    c) determining a gas pedal operation; if the gas pedal is depressed, maintain a fuel flow to the internal combustion engine; if the vehicle is stopped with the fuel flow off, releasing a brake to produce a brake position signal and operating the electric motor in accordance with the brake position signal to electrically turn the internal combustion engine to increase the vehicle speed to a predetermined creep speed; and
    d) providing the fuel flow and a spark to the internal combustion engine when a predetermined engine speed and a predetermined vehicle speed are reached.

2. In the control method of claim 1, operating the vehicle by providing the fuel flow and the spark to the internal combustion engine to accelerate the vehicle to a speed in excess of a predetermined speed and depress the gas pedal to start the engine by delivering the fuel flow and the spark to the internal combustion engine.

3. In the control method of claim 1, above a predetermined speed periodically determining the brake pedal operation and operating the vehicle in a deceleration mode by depressing the brake and conditioning the electric motor to produce regenerative braking.

4. In the control method of claim 3, during operation above the predetermined speed and in the deceleration mode if operating the gas pedal to cut off the fuel flow with neither the brake pedal or the gas pedal applied allowing the vehicle to automatically restart the engine before a drop-to-neutral or stall speed is reached.

5. In the control method of claim 3, depressing the brake to decelerate the vehicle to a drop-to-neutral speed by placing a gear in a low speed range and maintaining coasting by freewheel and restarting the internal combustion engine by the electric motor when the brake is released.

6. In the control method of claim 1, determining the vehicle speed to be below a stall speed and above a minimum speed of a hysteresis speed range and while operating the vehicle in a deceleration and engine stall mode and causing the fuel flow to the engine to be cutoff and starting the engine with the electric motor upon release of the brake during such deceleration and engine stall mode.

7. In the control method of claim 1, determining the number of electric restarts without sustaining a minimum vehicle speed for a predetermined time, and ratcheting up the predetermined vehicle speed to enable cut off of the fuel flow.

8. The method as in claim 1, wherein the direct drive belt is a direct mount between the internal combustion engine and the electric motor.

9. The method as in claim 1, wherein a motor/generator is used during fuel-off deceleration downshifts to synchronize the predetermined engine speed and a transmission.

10. The method as in claim 9, further comprising:
    e) releasing and reapplying an air conditioner clutch, said air conditioner clutch being manipulated during fuel-off downshift engine-transmission speed synchronizations.

11. A method for controlling the speed of a hybrid vehicle, comprising:
    accelerating the hybrid vehicle from 0 to a first predetermined speed by driving a crankshaft of an internal combustion engine with an electric motor;
    accelerating the hybrid vehicle from said first predetermined speed to a second predetermined speed by providing a flow of fuel and a spark to said internal combustion engine, wherein said second predetermined speed is higher than said first predetermined speed;
    maintaining a cruising speed range approximately equal to said second predetermined speed by cycling on and off said flow of fuel to one or more cylinders of said internal combustion engine;
    decelerating the hybrid vehicle from said cruising speed range to a third predetermined speed by cycling off said flow of fuel to the internal combustion engine to stall the engine, and by controlling said electric motor to provide a braking force to a road wheel of the hybrid vehicle and a recharging current for a battery;
    decelerating the hybrid vehicle from said third predetermined speed to a stop by leaving said internal combustion engine stalled and by shifting a transmission coupled to said internal combustion engine into a neutral state and by applying a braking force;

reaccelerating the hybrid vehicle from above said third predetermined speed by restarting said internal combustion engine, and by controlling said electric motor to remove said braking force; and reaccelerating the hybrid vehicle from below said third predetermined speed by restarting said internal combustion engine, and by shifting said transmission coupled to said internal combustion engine into a drive state.

12. The method as in claim 11, wherein restarting said internal combustion engine comprises:

monitoring a speed of said internal combustion engine;

controlling said electric motor to increase said speed to a predetermined level if said speed is below said predetermined level; and cycling on said flow of fuel to said internal combustion engine.

13. The method as in claim 11, wherein the hybrid vehicle is accelerated to said first predetermined speed by releasing a brake pedal.

14. The method as in claim 11, wherein the electric motor is connected to the crankshaft of said internal combustion engine by a direct drive belt.

15. The method as in claim 11, wherein a rotor of said electric motor is directly connected to said crankshaft of said internal combustion engine.

16. A propulsion system for use in a hybrid vehicle, comprising:

a propulsion system controller for actuating said propulsion system;

an internal combustion engine operatively coupled to said propulsion system controller, wherein said internal combustion engine includes a crankshaft;

an electric motor/generator system operatively coupled to said propulsion system controller and directly connected to said crankshaft, said crankshaft provides a driving force to a transmission and said transmission transmits said driving force to said at least one road wheel, said electric motor/generator system is configured to provide said driving force to said crankshaft or to receive said driving force from said crankshaft, said propulsion system controller accelerates the hybrid vehicle from 0 to a first predetermined speed by providing said driving force from said electric motor/generator system and accelerates the hybrid vehicle from said first predetermined speed to a second predetermined speed by providing said driving force from said internal combustion engine, wherein said second predetermined speed is higher than said first predetermined speed; and a brake pedal sensor and an accelerator pedal sensor operatively coupled to said propulsion system controller and for providing a plurality of inputs to said propulsion system controller, said plurality of inputs corresponding to movement of a brake pedal and an accelerator pedal.

17. The propulsion system as in claim 16, wherein said propulsion system controller decelerates the hybrid vehicle from said second predetermined speed to a third predetermined speed by providing said driving force to said electric motor/generator system such that said driving force operates said electric motor/generator system to generate a recharging current and a braking force opposite said driving force, wherein said second predetermined speed is higher than said third predetermined speed.

18. The propulsion system as in claim 16, wherein said electric motor/generator system is connected to said crankshaft at a position between said internal combustion engine and said transmission.

19. The propulsion system as in claim 16, wherein said electric motor/generator system is connected to said crankshaft at a forward end of said internal combustion engine and said transmission is coupled to said crankshaft at a rearward end of said internal combustion engine.

* * * * *